United States Patent [19]

Campbell

[11] 4,372,568

[45] Feb. 8, 1983

[54] LUGGAGE AND ACCESSORY TRAILER

[75] Inventor: James H. Campbell, Bloomfield Hills, Mich.

[73] Assignee: Spare Trunk Corporation, Southfield, Mich.

[21] Appl. No.: 198,310

[22] Filed: Oct. 20, 1980

[51] Int. Cl.³ .......................... B62D 63/06; B60D 1/06
[52] U.S. Cl. ..................................... 280/63; 280/204; 280/482; 280/491 B; 280/656; 296/173
[58] Field of Search .......... 280/400, 402, 482, 491 R, 280/491 B, 656, 204, 63, 789; 296/10, 168, 173, 175, 37.2

[56] References Cited

U.S. PATENT DOCUMENTS

| | | | |
|---|---|---|---|
| 2,725,242 | 11/1955 | Peplin | 280/204 |
| 2,876,036 | 3/1959 | Olsen | 280/482 |
| 3,325,206 | 6/1967 | Carlson | 296/173 |
| 3,458,231 | 7/1969 | Glass | 296/173 |
| 3,610,678 | 10/1971 | Brokaw | 296/37.2 |
| 3,784,230 | 1/1974 | Worrall, Jr. | 280/789 |

Primary Examiner—Joseph F. Peters, Jr.
Assistant Examiner—Donn McGiehan
Attorney, Agent, or Firm—Harness, Dickey & Pierce

[57] ABSTRACT

A small trailer that may be towed behind a small passenger automobile comprises a two wheel chassis with a clam shell type container that includes a lower half which is secured to the chassis and an upper half which is removable from the lower half to which it is normally hinged, the upper half being shaped to nest over the bottom of the chassis whereby the trailer may be readily stowed in a vertical position in the owner's garage.

10 Claims, 15 Drawing Figures

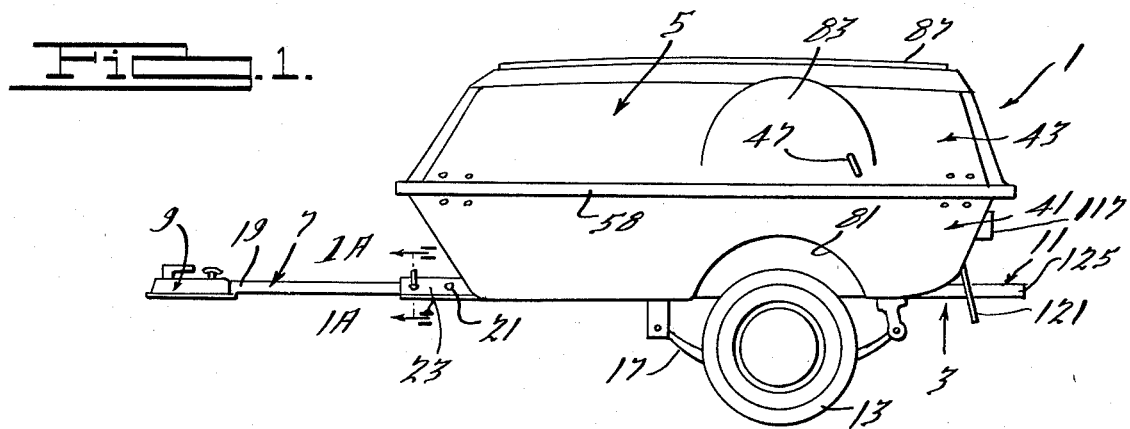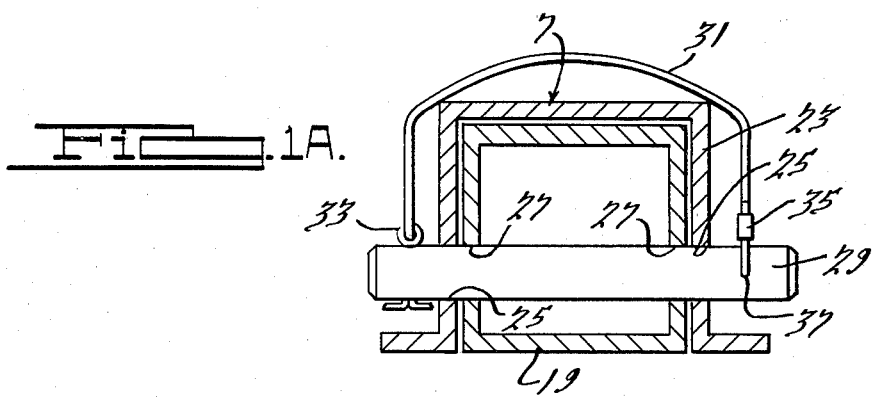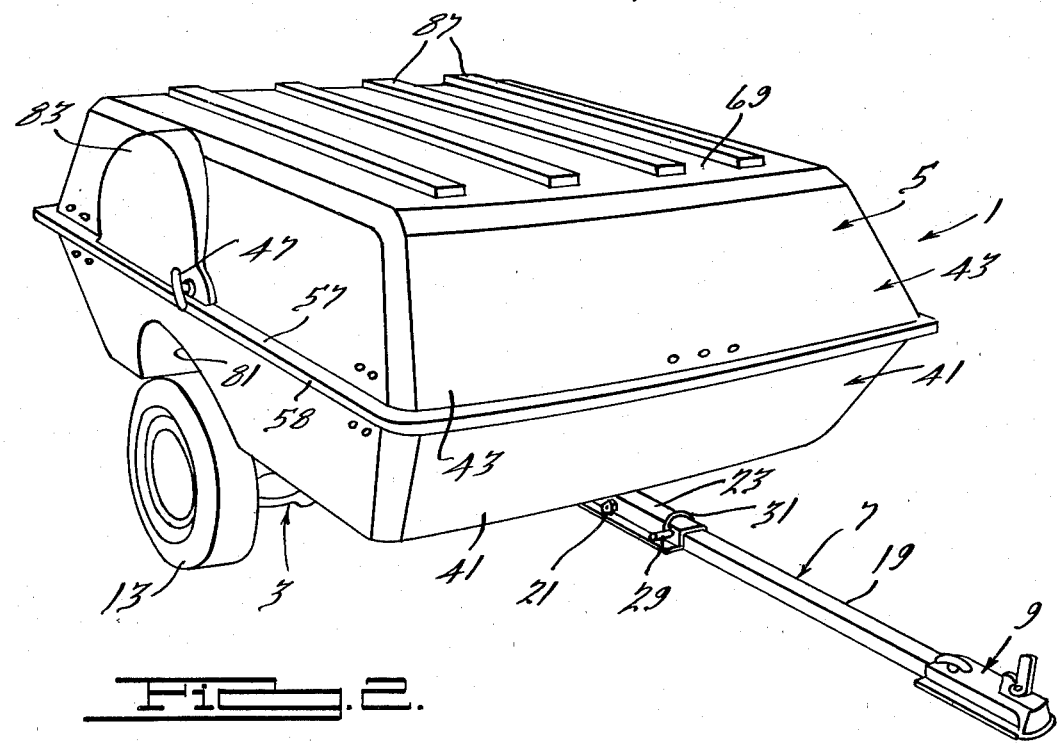

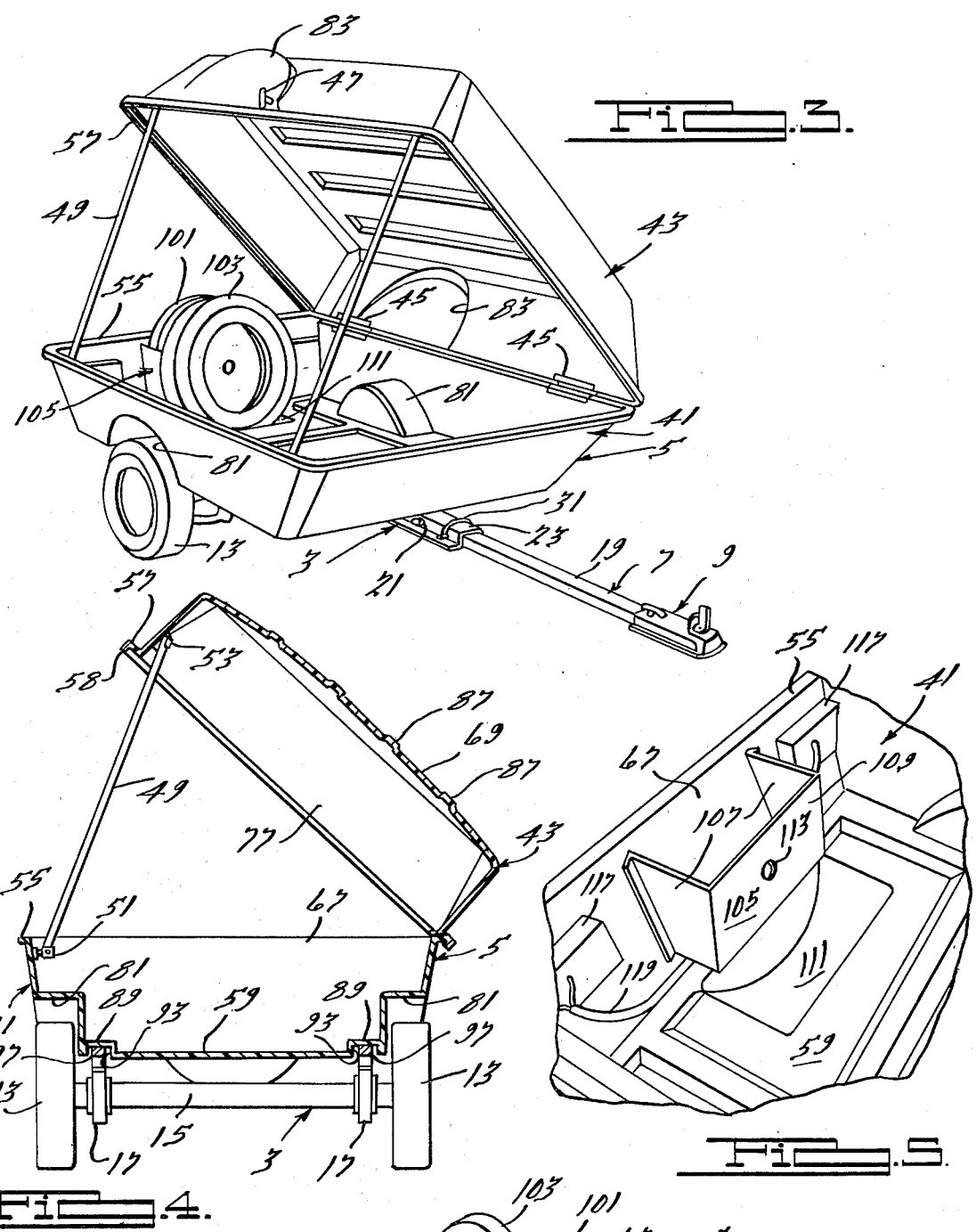
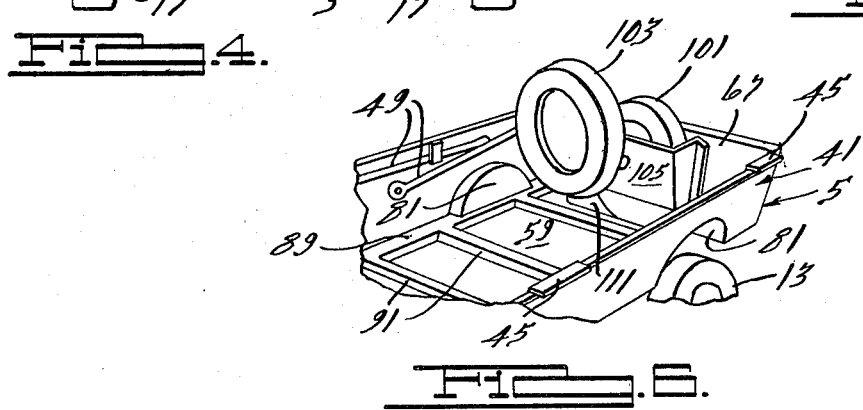

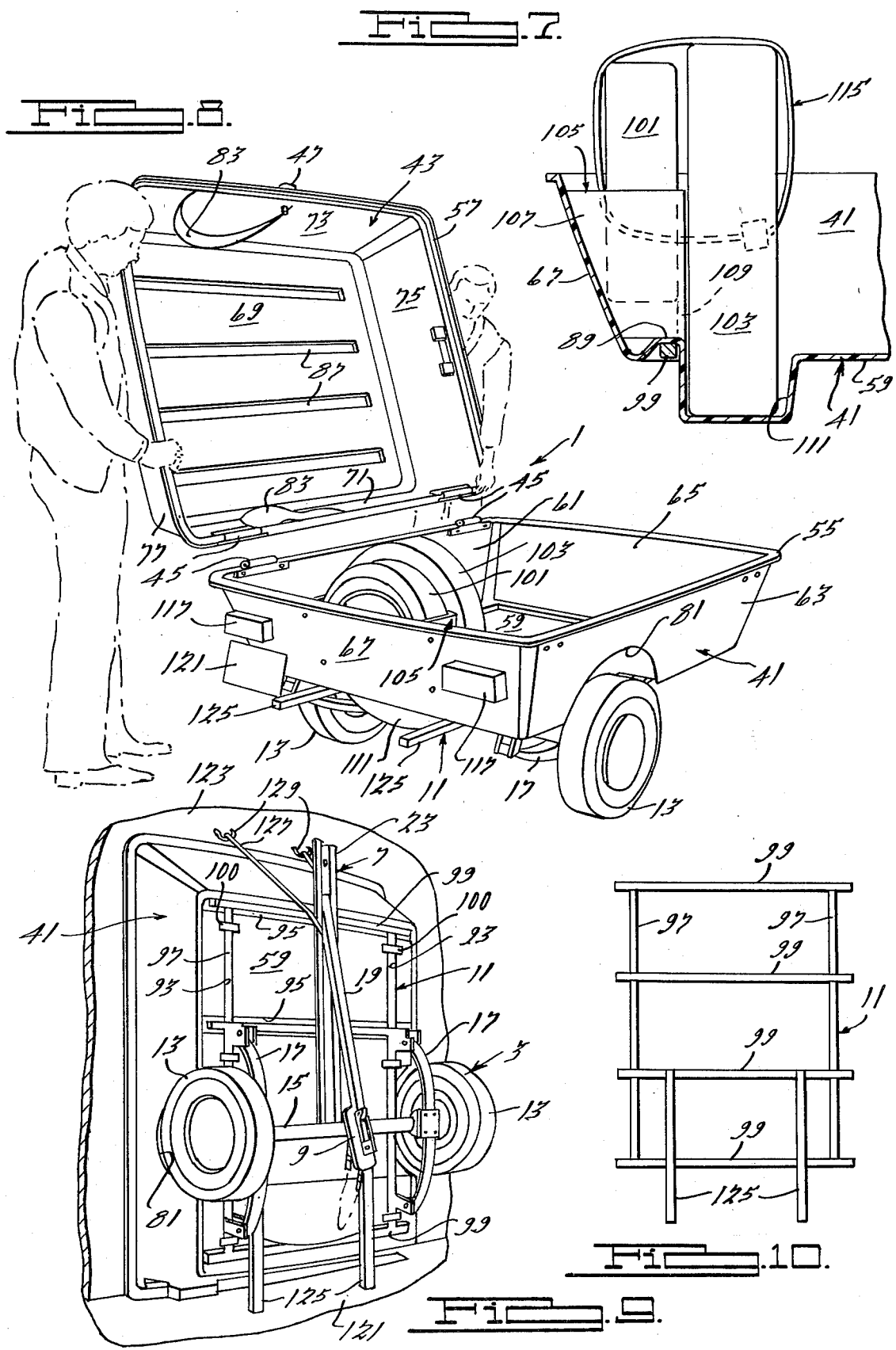

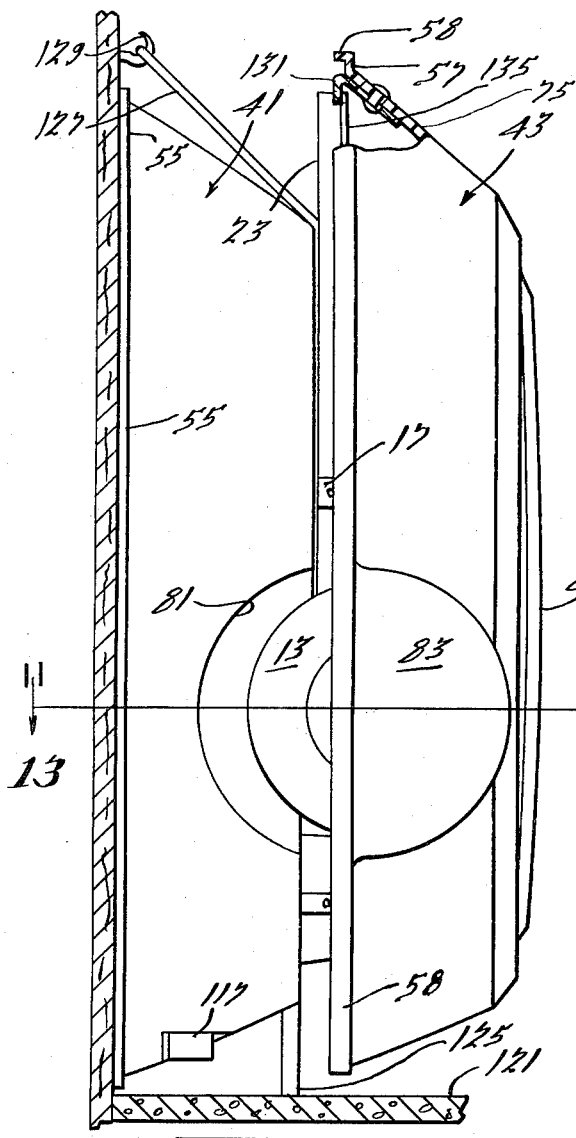
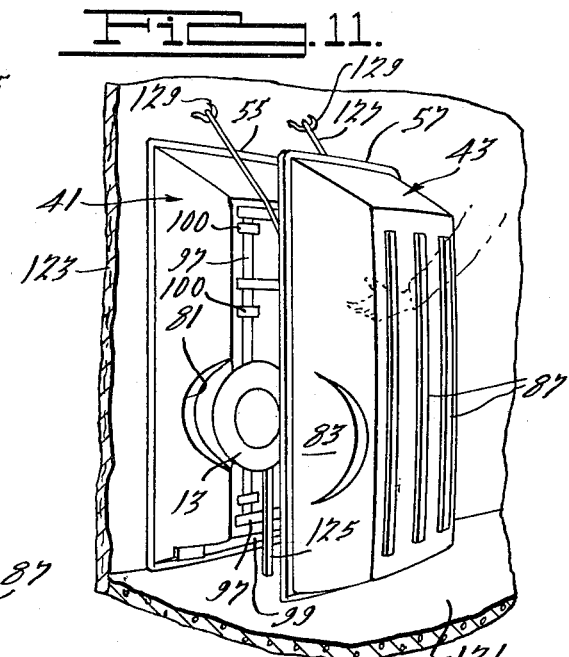
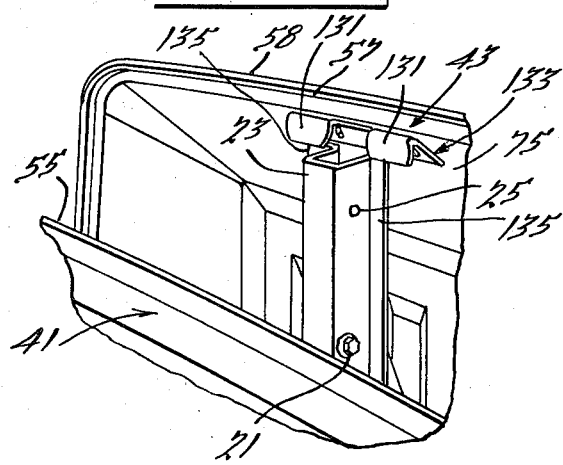
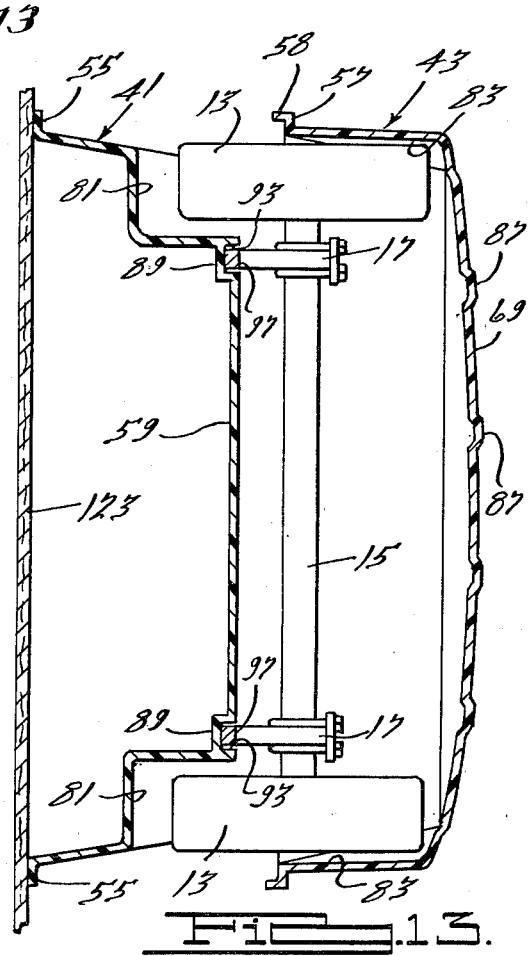

LUGGAGE AND ACCESSORY TRAILER

BRIEF SUMMARY OF THE INVENTION

This invention relates to small utility type trailers which may be towed along behind small vehicles.

It is the purpose of the invention to provide a small, light-weight trailer for use with small vehicles to carry luggage and accessories that would normally be carried in the trunk of a larger vehicle.

The invention comprises a small two-wheel chassis that supports a two-piece luggage and accessory container to form a small, light-weight trailer that can fit within the silhouette of a small automobile. The container has a bottom half which is securely attached to the chassis and a top half which is fastened to it in a detachable manner so that the top may be easily removed and separated from the container. The chassis and container bottom are adapted to be placed against a wall of a garage or the like and secured with the tongue in a vertical, upwardly extending position and the open side of the bottom facing the wall of the garage. In this position, the top of the container, which has been removed, can be fitted over the wheels and the bottom of the chassis and nested in place over them so that the entire assembly can be compactly stored in a very small space within the garage. Frame members of the chassis are extended beyond the rear of the container to provide a means for supporting the trailer in a vertical stowed position. The tongue is of two-piece construction in which one piece can be moved out of the way during storage to reduce the height of space that the vehicle will occupy and the other piece can be used to support the top of the container during storage.

DESCRIPTION OF THE DRAWINGS

FIG. 1 is a side elevation of a trailer embodying the invention;

FIG. 1A—1A is a cross section along the line 1A—1A of FIG. 1;

FIG. 2 is a perspective view, enlarged, showing the front and right side of the trainer of FIG. 2;

FIG. 3 is a perspective view similar to that of FIG. 2, on a smaller scale, and showing the lid of the trailer body in open position;

FIG. 4 is a transverse cross section, somewhat schematic and with parts omitted, through the trailer when in the condition of FIG. 3;

FIG. 5 is a perspective view, broken away, looking down on the tire retainer means at the rear of the trailer body bottom;

FIG. 6 is a perspective view, broken away, with the lid removed, looking down on the trailer body bottom from the left side of the trailer and showing the spare tire for an automobile being put in place or removed from the tire retainer means;

FIG. 7 is a vertical cross section, broken away, with parts omitted, through the back of the trailer body bottom to show the tire retainer means;

FIG. 8 is a perspective view taken from the right rear of the trailer showing the lid being attached to or removed from the bottom of the body;

FIG. 9 is a perspective view of the bottom of the trailer, the lid being removed, showing it in a vertical, stowed position against the wall of a residential garage or the like;

FIG. 10 is a plan view showing the rigid steel grid that is a part of the trailer chassis;

FIG. 11 is a perspective view, somewhat similar to FIG. 9, but on a reduced scale and showing the trailer body lid being put in place for storage;

FIG. 12 is a side elevation of the trailer in stowed position against the wall of a garage or the like.

FIG. 13 is a horizontal cross section, somewhat schematic and with parts omitted, through the trailer in the stowed position of FIG. 12 as taken generally along line 13—13 of FIG. 12; and FIG. 14 is a perspective view, broken away, of the top inside of the trailer lid in stowed position showing it hooked on the chassis tongue.

DESCRIPTION OF THE INVENTION

The invention is embodied in the small car utility trailer 1 which is illustrated in the drawings. It comprises a chassis 3 and a body 5, in the form of a hollow, covered container or receptable, which is mounted on and secured to the chassis. The chassis 3 includes a long tongue 7 with a suitable hitch 9 at its front end to provide means for removably attaching the trailer to the rear of a small automobile (not shown).

The trailer 1 is designed to be light in weight (less than 200 pounds) and of a size and shape to ride inside of a small automobile's silhouette in order to minimize wind drag and resistance. Consequently the trailer 1 is fuel efficient and has a minimum adverse effect on the gasoline mileage of a small car, even when it is loaded with luggage and other things normally carried in the trunk of a car.

The chassis 3 includes a frame 11 and a conventional wheel subassembly with a pair of wheels 13 at opposite ends of an axle 15 and resiliently attached to frame 11 by left and right hand leaf spring assemblies 17.

The tongue 7 is constructed in a special way in order to facilitate compact stowage, as will be described hereinafter. It has a front section 19 which is hinged on a hinge pin at 21 to a rear section 23 so that it can be folded back to overlap the rear section (see FIG. 9). The front section 19 is preferably tubular and substantially square in cross section; the rear section is preferably hat shaped and sized so that the front section nests inside of it. The rear section is quite long and rigidly secured at several points along its length to the frame 11 at right angles to the axis of the wheels 13. The forward part of the hat section 23 has aligned apertures 25 in the opposite sidewalls and these can register with aligned apertures 27 in opposite sides of square tubular front section 19. In the aligned hole condition the tongue 7 is straight and ready for operative attachment to an automobile. The two tongue sections 19 and 23 are held in the straight, relatively rigid condition by means of a removable cross pin 29 that can be inserted into the aligned apertures 25 and 27. The pin 29 is held in place by a retaining means which includes a wire or cord 31 that is anchored at one end of the pin, as seen at 33, and has a suitable releasable connection 35 at its other end that extends through aperture 37 in the pin 29. This arrangement permits the cord 31 to be selectively, but not inadvertently, removed from the pin and the pin to be retained in operative position uniting the front and rear tongue sections.

The trailer body 5 has a bottom 41 that is secured to the chassis frame 11 and a top or lid 43 that is mounted on the bottom. The body 5 is preferably of a clam-shell design with the lid 43 hinged to the bottom along one longitudinal edge so that it can be moved between the closed position of FIG. 2 and the open position of FIG. 3. A pair of hinge devides 45 attach the lid to the bottom and, as seen in FIGS. 3 and 8, these are preferably of the quick release type which permit total disconnection upon appropriate movement of the lid relative to the bottom whereby the lid may be completely removed. The side of the body opposite to the hinge means 45 has a handle operated latch and key lock device 47 mounted on aligned parts of the lid and body so that when the lid is closed it may be latched and locked in place in a manner similar to that of the traditional latch and lock system for the trunk lid of an automobile. Hinged struts 49, similar to those used to hold automobile hoods in the open position, may be pivotally attached at 51 to the bottom whereby they may be moved between an upright position wherein they temporarily fit in sockets 53 in the lid 43 and a stowed position (FIG. 6) inside the bottom 41.

The bottom 41 and lid 43 are, in general, of about the same size and shape with the open top of the bottom being defined by a flange-like rim 55 and the open bottom of the lid being defined by a corresponding flange-like rim 57 with a lip 58 around its periphery to fit over the edge of rim 55. The two rims 55 and 57 fit together when the body is closed and seal means (not shown) similar to that used to seal conventional automobile trunk lid, may be used, if needed or desired, to make the joint between the rims water tight. Thus, an enclosed luggage compartment with the capacity of a large automobile trunk is provided.

The bottom 41 has a bottom wall or floor 59, left and right hand sidewalls 61 and 63, (FIG. 8), and front and rear sidewalls 65 and 67, the sidewalls all terminating at the top in the rim 55. The top or lid 43 has a top wall or roof 69, left and right hand sidewalls 71 and 73, and front and rear sidewalls 75 and 77, the sidewalls all terminating at their lower edge in the rim 57. The sidewalls of both the bottom and the lid taper inwardly from their respective rims thereby adapting the shape to manufacture by molding or other known processes from suitable light, durable plastic material, such as ABS plastic. The width of the bottom 41 and the lid 43 is several inches greater than the tread width of the chassis across wheels 13. Accordingly, the sidewalls 61 and 63 of the bottom are shaped to provide exterior wheel wells 81 over the wheels 13 that provide ample room for wheel deflection relative to the body 5. The sidewalls 71 and 73 of the lid 43 are shaped to provide interior wheel wells 83 that fit over the bottoms of the wheels 13 when the trailer is stored, as will be described (See FIGS. 11 and 12).

The top wall or roof 69 of the cover 43 is preferably formed to have in it a series of outwardly (upwardly) projecting, parallel, longitudinally extending ribs 87 that not only reinforce the wall but can serve as rails to support objects (not shown) that may be carried on the top of the trailer in a manner corresponding to the use of car top carriers on automobiles. The bottom wall 59 of the bottom 41 has a pair of parallel, longitudinally extending, inwardly (upwardly) projecting ribs 89 formed in it and these are intersected by a series of four parallel, transverse, inwardly (upwardly) projecting ribs 91 formed in it. The ribs 89 and 91 define downwardly opening recesses or channels 93 and 95, respectively. The two longitudinal channels 93 receive the two longitudinal side bars 97 that form a part of the grid structure of frame 11 (FIG. 10) and the four transverse channels 95 receive the four transverse bars 99 of the grid frame 11. Preferably, load absorbent material (not shown) is packed around the bars 97 and 99. Fastening means, such as screws, may be used to fasten the bottom wall 59 to the bars 97 and 99 in a pattern and manner to achieve a satisfactory distribution of load and stress pattern in the plastic bottom 41. Fastening means in the form of cross straps 100 riveted to the bottom side of wall 59 to hold the bars 97 and 99 in the channels is illustrated.

The bottom 41 is preferably adapted to carry a spare tire 101 for the trailer 1 and a spare tire 103 for the automobile (not shown) with which it is used. Means for this purpose includes a U-shaped wall forming member 105 that has legs 107 rigidly secured to the back wall 67 to space the base or wall 109 of the U inwardly from wall 67. The space between walls 67 and 109 defines a pocket that snugly receives the relatively small trailer tire 101. On the forward side of wall 109 there is a wall 111 in the trailer floor 59 (FIG. 7) to help accommodate the substantially larger diameter of tire 103 so that in the stowed positions tire 103 is only slightly higher than tire 101. The wall 109 has an opening 113 that provides a passage for a removable flexible retainer strap 115 (only shown in FIG. 7) that can be used to encircle the two tires and hold them in place on and against the wall 109. Other or additional means (not shown) for clamping the tires to member 105 may be used if desired.

The bottom 41 is also provided with the required electrical equipment such as stop and running light fixtures 117 mounted on back wall 67 and electrical wiring 119. There is also a license plate bracket 121 on the back wall 67 as shown in FIGS. 1 and 8.

When not in use, the trailer 1 can be neatly stored in a small compact space; for example, on the floor 121 and against the wall 123 (FIGS. 9, 11–13) of a garage. In storing the trailer, the first step is to remove the cover 43, as illustrated in FIG. 8, and set it aside. The next step is to unfasten the retainer strap 115 (FIG. 7) and remove the spare tires 101 and 103 since they project above the rim 55 of the bottom 41. The trailer is then moved next to the wall 123 and raised so that it stands on the two legs 125 which are a rigid part of frame 11 (FIG. 10) and project rearwardly to slightly beyond the back end of bottom 41 (FIG. 12) where they can also act as a bumper means to protect the rear of the trailer. The bottom 41 is shifted so that rim 55 is flush with the wall 123. The pin 29 is removed and tongue section 19 folded down underneath the chassis (FIG. 9) and a resilient cable 127 is passed through the corner below the permanent hinge pin and fastened at each end to eye bolts 129 secured in the wall 123 above the bottom 41 and on opposite sides of the tongue 7. Thus, the trailer, with lid is removed, is snugly held on legs 125 flush against wall 123 by cable 127. The light-weight lid 43 can then be nested over the underside of the trailer with the wheels 13 fitting into wells 83 (FIGS. 11–13) and with bent over ears 131 on bracket 133 fixed at the top of lid front wall 75 sliding down over the top ends of the side flanges 135 on the tongue section 23 (FIGS. 12 and 14). The connection of bracket 133 to tongue section 23 preferably carries all of the weight of the lid but weight could also be carried by the top sides of wells 83 resting on wheels 13. The connection of bracket 133 to tongue section 23 holds the lid 43 in its nested, compacted position of FIGS. 12 and 13.

Thus, the invention provides a small, lightweight trailer that serves as a traveling trunk or luggage compartment. In a preferred shape the trailer would be only about 40" high so that a luggage rack (not shown) could be mounted on the roof 87 to enable the trailer to carry on top many additional items such as bicycles, camping equipment, ski equipment, etc. The overall width of the preferred shape would be about 52" and the luggage compartment itself would be about 68" in length and provide nearly fifty cubic feet of enclosed storage space. When stored as shown in FIGS. 12-13, the trailer takes up only about 28"×52" of garage floor space, which is not more than a bicycle.

The tapered front, rear, and sidewalls of the lightweight container compartment body 5 are not only stylish but of a shape to minimize wind resistance and promote fuel economy. As seen best in FIG. 1, the increased taper of the front walls as compared with the rear walls not only gives a pleasing appearance but will assist aerodynamically. The size of the body 5 enables it to ride within the silhouette of a small automobile to minimize wind drag. The spare tire support means (as provided by member 105) that enables a full size automobile wheel 103 as well as a spare trailer wheel 101 to be compactly carried by the trailer is a feature of special value when vacation trips are undertaken by families.

Modifications may be made in the specific details disclosed without departing from the spirit and scope of the invention.

I claim:

1. A small, light-weight, utility trailer for use with a small automobile to carry luggage and accessories and the like which are ordinarily carried in the trunk of an automobile comprising a closed container type trailer body having upper and lower clam shell type sections sized to substantially fit within the silhouette of said small automobile, means for removable securing the upper clam shell section to the lower clam shell section so that it can be easily detached from the lower section, a chassis including a frame and a pair of wheels resiliently mounted on the frame, means securing the lower clam shell section to the frame, said chassis including a tongue for removable attachment to the rear of a small automobile, said tongue having separate front and rear sections, means for selectively connecting the front and rear tongue sections together in alignment for operative attachment to the rear of an automobile and for movement of the front section relative to the rear section to reduce the overall length of the tongue when it is desired to store the trailer, means for supporting the lower clam shell section and the chassis in a vertical position with the tongue extending vertically upward when it is desired to store the trailer said upper clam shell section being wider on the inside than the external width of the chassis across the wheels whereby for trailer storage it can be nested over the underside of the chassis and wheels when the chassis and lower section are in said vertical position, and bracket means attachable to said tongue for removably attaching the upper clam shell section in said vertical position to the chassis and lower clam shell section.

2. A small, light-weight, utility trailer for use with a small automobile to carry luggage and accessories and the like which are ordinarily carried in the trunk of an automobile comprising a closed container type trailer body having upper and lower sections sized to substantially fit within the silhouette of said small automobile, means for removably securing the upper section to the lower section so that it can be easily detached from the lower section, a chassis including a frame and a pair of wheels resiliently mounted on the frame, means securing the lower section to the frame, said chassis including a tongue for removable attachment to the rear of a small automobile, said tongue having separate front and rear sections, means for selectively connecting the front and rear tongue sections together in alignment for operative attachment to the rear of an automobile and for movement of the front section relative to the rear section to reduced the overall length of the tongue when it is desired to store the trailer, means for supporting the lower section and the chassis in a vertical position with the tongue extending vertically upward when it is desired to store the trailer, said upper section being wider on the inside than the external width of the chassis across the wheels whereby for trailer storage it can be nested over the underside of the chassis and wheels when the chassis and lower section are in said vertical position, and means for removably attaching the upper section to the chassis and lower section in said vertical position, said front and rear tongue sections being hinged together and the front section being foldable beneath the rear section when it is desired to store the trailer, said last mentioned means including fastening means for securing the upper body section on the end of the rear section of the tongue in said vertical position.

3. A trailer as set forth in claim 2 wherein said chassis frame includes rearwardly extending members to provide leg means for supporting the lower section and the chassis in said vertical position.

4. A trailer as set forth in claim 2 including flexible means extending through the corner between the front and rear tongue sections when folded for holding the chassis and lower section in vertical position for storage.

5. A trailer as set forth in claim 4 wherein the top edge of said lower section defines a flat plane whereby said lower section and chassis may be fitted flush against a vertical wall when they are in said vertical position for storage, said flexible means being adapted to selectively hold said chassis and lower section snugly against such vertical wall.

6. A trailer as set forth in claim 2 wherein said rear tongue section includes lateral flange means, said upper section having bracket means on a front wall to fit over said flange means and provide said fastening means.

7. A trailer as set forth in claim 2 wherein said upper and lower sections of said body are of substantially the same size and shape and are hinged together along a longitudinal edge.

8. A trailer as set forth in claim 7 wherein said lower section has means including a tire well formed wherein for removably mounting and holding spare tires for both said automobile and said trailer therein.

9. A trailer as set forth in claim 8 wherein said upper and lower sections are composed of non-metallic thin-walled molded plastic material.

10. A trailer as set forth in claim 9 wherein said upper and lower sections form a body of the clam shell type.

* * * * *

UNITED STATES PATENT AND TRADEMARK OFFICE
CERTIFICATE OF CORRECTION

PATENT NO. : 4,372,568
DATED : February 8, 1983
INVENTOR(S) : James H. Campbell

It is certified that error appears in the above—identified patent and that said Letters Patent is hereby corrected as shown below:

Col. 1, line 43, "trainer" should read --trailer--

Col. 3, line 3, "devides" should read --devices--

Col. 5, line 50, insert --,-- after "trailer"

Col. 6, line 66, "wherein" should read --therein--.

Signed and Sealed this

Seventeenth Day of April 1984

[SEAL]

*Attest:*

GERALD J. MOSSINGHOFF

*Attesting Officer*     *Commissioner of Patents and Trademarks*